United States Patent [19]
Sawada et al.

[11] Patent Number: 5,271,292
[45] Date of Patent: Dec. 21, 1993

[54] ROBOT

[75] Inventors: Yasuhiro Sawada, Chofu; Takeo Tanita; Yusaku Azuma, both of Yokohama; Yasuo Karube, Ibaraki, all of Japan

[73] Assignee: Canon Kabushiki Kaisha, Tokyo, Japan

[21] Appl. No.: 797,946

[22] Filed: Nov. 26, 1991

[30] Foreign Application Priority Data

Nov. 28, 1990 [JP] Japan .................. 2-322503

[51] Int. Cl.[5] .................. G05G 11/00; B25J 11/00
[52] U.S. Cl. .................. 74/479 BF; 318/466; 318/568.17; 340/671; 474/69; 901/9; 901/21
[58] Field of Search ........... 74/479 R, 479 BF, 479 B; 318/466, 489, 568.17, 568.18, 568.19; 340/671; 474/69, 70, 102; 901/9, 21, 46, 47

[56] References Cited

U.S. PATENT DOCUMENTS

| | | | |
|---|---|---|---|
| 3,562,427 | 2/1971 | Yano et al. | 474/70 X |
| 4,035,790 | 7/1977 | Farmer | 340/671 X |
| 4,072,893 | 2/1978 | Huwyler | 340/671 X |
| 4,600,869 | 7/1986 | Sekine et al. | 318/568.16 X |
| 4,620,831 | 11/1986 | Poncet et al. | 901/21 X |
| 4,706,515 | 11/1987 | Yasukawa | 901/21 X |
| 4,754,663 | 7/1988 | Yasukawa | 901/21 X |
| 4,951,517 | 8/1990 | Azuma et al. | 74/209 |
| 5,046,915 | 9/1991 | Azuma et al. | 414/744.5 |

FOREIGN PATENT DOCUMENTS

| | | |
|---|---|---|
| 61-172594 | 10/1986 | Japan . |
| 62-10806 | 1/1987 | Japan . |
| 62-121091 | 7/1987 | Japan . |
| 63-54605 | 10/1988 | Japan . |

Primary Examiner—Leslie A. Braun
Assistant Examiner—David W. Laub
Attorney, Agent, or Firm—Fitzpatrick, Cella, Harper & Scinto

[57] ABSTRACT

An industrial robot is provided with a body, a horizontal arm pivotally supported on the body, and a vertical arm mounted on the tip end portion of the horizontal arm for rotation about its own center axis. The robot includes a drive motor for rotatively driving the vertical arm, speed reduction means for speed-reducing and transmitting the drive force of the drive motor through a first output pulley to a second output pulley, and first and second detected portions mounted on the first and second output pulleys, respectively, with respective predetermined ranges of extension and indicating the original point position of the vertical arm by the difference between the respective phases. In addition, first and second detectors are fixed to the horizontal arm and output first and second detection signals, respectively, as long as they are detecting the first and second detected portions, respectively, and a controller is provided for judging the original point position of the vertical arm on the basis of the output modes of the first and second detection signals from the first and second detectors respectively.

7 Claims, 7 Drawing Sheets

ROBOT

BACKGROUND OF THE INVENTION

1. Field of the Invention

This invention relates to an industrial robot provided with a strut supported for pivotal movement about a vertical axis, a first horizontal arm integrally mounted so as to extend sideways from the strut and pivotally moved in a horizontal plane with the pivotal movement of the strut, a second horizontal arm supported on the tip end portion of the first horizontal arm for pivotal movement in a horizontal plane, and a vertical arm supported on the tip end portion of the second horizontal arm for movement along the vertical axis and for rotation about the vertical axis.

2. Related Background Art

Heretofore, in an industrial robot comprised of a horizontal multi-articulation robot, etc., an attempt to rotate a vertical arm about a vertical axis over a range of rotation of 360° or more has led to the following problem if a dog to be detected mounted on the vertical arm is only detected. That is, regarding the operation of arriving at the original point, how many times the vertical arm has been rotated is unclear and the direction of rotation of the vertical arm for arriving at the original point cannot be prescribed efficiently. Also, where the range of rotation is prescribed to a predetermined angle, it is impossible to prescribe a range of angle of 360° or more with regard to overrun detection for judging whether the rotation exceeds said range of rotation. At this point, the detection width of the dog corresponding to a predetermined amount becomes necessary and therefore, exactly, a range of angle obtained by this detection width being subtracted from 360° is a range of rotation within which overrun can be detected.

Therefore, heretofore, there have been known, for example, a method of providing a speed reduction mechanism in a dog, as shown in Japanese Laid-Open Utility Model Application No. 62-121091, a method of an intermittently moving portion and detecting the number of rotations, as shown in Japanese Laid-Open Utility Model Application No. 62-172594, a method of using a logic circuit by a flip-flop, as shown in Japanese Utility Model Publication No. 62-10806, and a technique of exerting contrivances on a sensor and a dog, as shown in Japanese Patent Publication No. 63-54605.

However, in such heretofore known constructions, particularly those mechanically constructed, overrun detection at an accurate position is impossible due to back-lash or the like, and the presence of mechanically contacting portions leads to problems with respect to service life and reliability reduced by abrasion.

Also, in those constructions electrically constructed, for example, regarding the arrival at the original point, even when the power source of the robot is cut off due to power failure or the like, it is necessary for a control unit to know how many times the vertical arm has been rotated, and information imparting means for backing up this becomes discretely necessary. Also, regarding overrun detection, a circuit therefor must always be kept in its operable state, and it leads to a reduction in reliability to add such an overrun detection circuit to a control circuit, and from this point of view, it is desired to the utmost that such an overrun detection circuit be not disposed between a sensor and a robot controller.

SUMMARY OF THE INVENTION

The present invention has been made in view of the above-noted problems and an object thereof is to provide an industrial robot in which the rotated state of a vertical arm is mechanically detected and which can accomplish the arrival at the original point with good accuracy.

Another object of the present invention is to provide an industrial robot in which the rotated state of a vertical arm is mechanically detected and in which overrun detection can be easily accomplished with a range of rotation of 360° or more prescribed.

Still another object of the present invention is to provide an industrial robot in which the rotated state of a vertical arm is mechanically detected and which can accomplish the arrival at the original point with good accuracy and in which overrun detection can be easily accomplished with a range of rotation of 360° or more prescribed.

To solve the above-noted problems and achieve the above object, the industrial robot according to the present invention is an industrial robot provided with a body, a horizontal arm pivotally supported on said body, and a vertical arm mounted on the tip end portion of said horizontal arm for rotation about its own center axis. The robot includes a drive motor for rotatively driving said vertical arm, speed reduction means for speed-reducing and transmitting the drive force of said drive motor through a first output pulley to a second output pulley, first and second detected portions mounted on said first and second output pulleys, respectively, with respective predetermined ranges of extension and indicating the original point position of said vertical arm by the difference between the respective phases thereof, first and second detecting means fixed to said horizontal arm and outputting first and second detection signals, respectively, as long as they are detecting said first and second detected portions, respectively, and control means for judging the original point position of said vertical arm on the basis of the output modes of the first and second detection signals from said first and second detecting means, respectively.

Also, the industrial robot according to the present invention is an industrial robot provided with a body, a horizontal arm pivotally supported on said body, and a vertical arm mounted on the tip end portion of said horizontal arm for rotation about its own center axis. The robot includes drive motor for rotatively driving said vertical arm, speed reduction means for speed-reducing and transmitting the drive force of said drive motor through a first output pulley to a second output pulley, third and fourth detected portions mounted on said first and second output pulleys, respectively, with respective predetermined ranges of extension and indicating the range of rotation of said vertical arm by the difference between the respective phases thereof, third and fourth detecting means fixed to said horizontal arm and outputting third and fourth detection signals, respectively, as long as they are detecting said third and fourth detected portions, respectively, and control means for judging the rotated state of said vertical arm over the range of rotation thereof or greater on the basis of the output modes of the third and fourth detection signals from said third and fourth detecting means, respectively.

Also, the industrial robot according to the present invention is an industrial robot provided with a body, a horizontal arm pivotally supported on said body, and a vertical arm mounted on the tip end portion of said horizontal arm for rotation about its own center axis. The robot includes a drive motor for rotatively driving said vertical arm, speed reduction means for speed-reducing and transmitting the drive force of said drive motor through a first output pulley to a second output pulley, first and second detected portions mounted on said first and second output pulleys, respectively, with respective predetermined ranges of extension and indicating the original point position of said vertical arm by the difference between the respective phases thereof, first and second detecting means fixed to said horizontal arm and outputting first and second detection signals, respectively, as long as they are detecting said first and second detected portions, respectively, third and fourth detected portions mounted on said first and second output pulleys, respectively, with respective predetermined ranges of extension and indicating the range of rotation of said vertical arm by the difference between the respective phases thereof, third and fourth detecting means fixed to said horizontal arm and outputting third and fourth detection signals, respectively, as long as they are detecting said third and fourth detected portions, respectively, and control means for judging the original point position of said vertical arm on the basis of the output modes of the first and second detection signals from said first and second detecting means, respectively, and also judging the rotated state of said vertical arm over the range of rotation thereof or greater on the basis of the output modes of the third and fourth detection signals from said third and fourth detecting means, respectively.

DESCRIPTION OF THE PREFERRED EMBODIMENTS

The construction of an embodiment of the industrial robot according to the present invention will hereinafter be described in detail with reference to the accompanying drawings.

Figure 1:
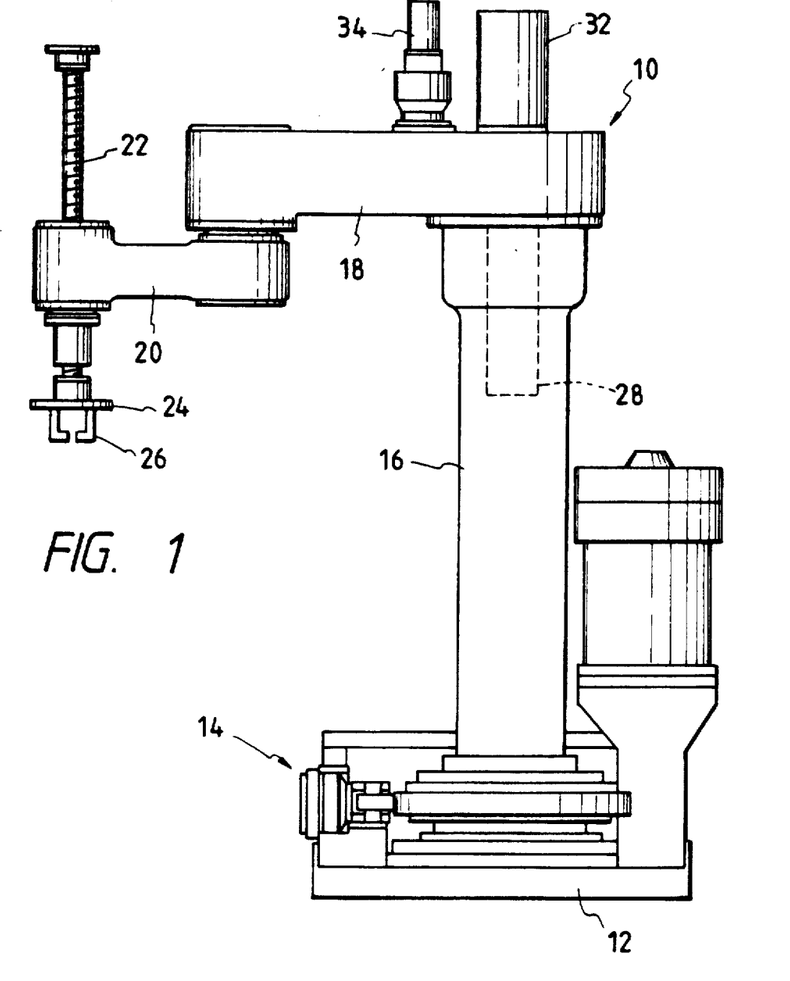
FIG. 1 is a front view schematically showing the construction of an embodiment of an industrial robot according to the present invention.
Figure 2:
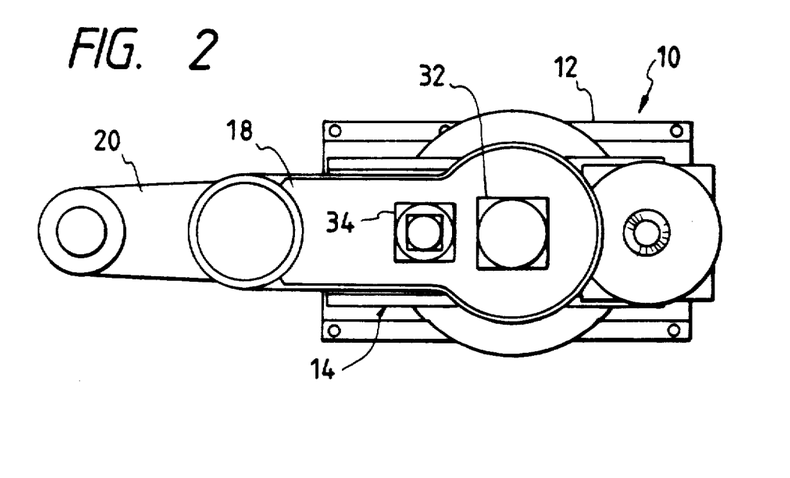
FIG. 2 is a top plan view showing the construction of the industrial robot of FIG. 1 in detail.

This multi-articulation robot 10 is constructed in a horizontal scalar fashion, as shown in FIGS. 1 and 2, and is provided with a base 12 constructed on a foundation (not shown) and a strut 16 mounted on the base 12 for rotation about a vertical axis and rotatively driven by a rotative driving friction device 14. The base end portion of a first horizontal arm 18 extending horizontally is secured to the tip end portion of the strut 16. Also, the base end portion of a second horizontal arm 20 is rotatably mounted on the tip end portion of the first horizontal arm 18. A vertical arm 22 is mounted on the tip end portion of the second horizontal arm 20 for rotation about a vertical axis and for vertical movement along the vertical axis. A finger device 26 is secured to the lower end of the vertical arm 22 with a compliance device 24 interposed therebetween.

The strut 16 is formed of a hollow cylindrical member, and a first drive motor 28 for rotatively driving the second horizontal arm 20 relative to the first horizontal arm 18 is contained in the strut 16. Also, the first and second horizontal arms 18 and 20 each are formed of a hollow member. A first transmission mechanism 30 (see FIG. 3) for connecting the base end portion of the second horizontal arm 20 and the drive shaft of the first drive motor 28 together is disposed extending through the interior of the first horizontal arm 18.

A second drive motor 32 for moving the vertical arm 22 along a vertical direction (a vertical axis) and a third drive motor 34 for rotatively driving the vertical arm 22 about the vertical axis are placed on the upper portion of the strut 16. The drive forces of the second and third drive motors 32 and 34 are set so as to be transmitted to the vertical arm 22 by second and third transmission mechanisms 36 and 38 disposed through the first and second horizontal arms 18 and 20. Further, the aforementioned finger device 26 is designed to be driven through a drive mechanism (not shown) and grasp a part (not shown).

Although not shown, rotary encoders for detecting the amounts of rotation of the first to third drive motors 28, 32 and 34 are mounted on these motors and are connected to a control unit which will be described later.

The construction of the first transmission mechanism 30 for rotatively driving the second horizontal arm 20 in the multi-articulation robot 10 constructed as briefly described above and of the second and third transmission mechanisms 36 and 38 for driving the vertical arm 22 will now be described in detail with reference to FIGS. 3 and 4.

Figure 3:
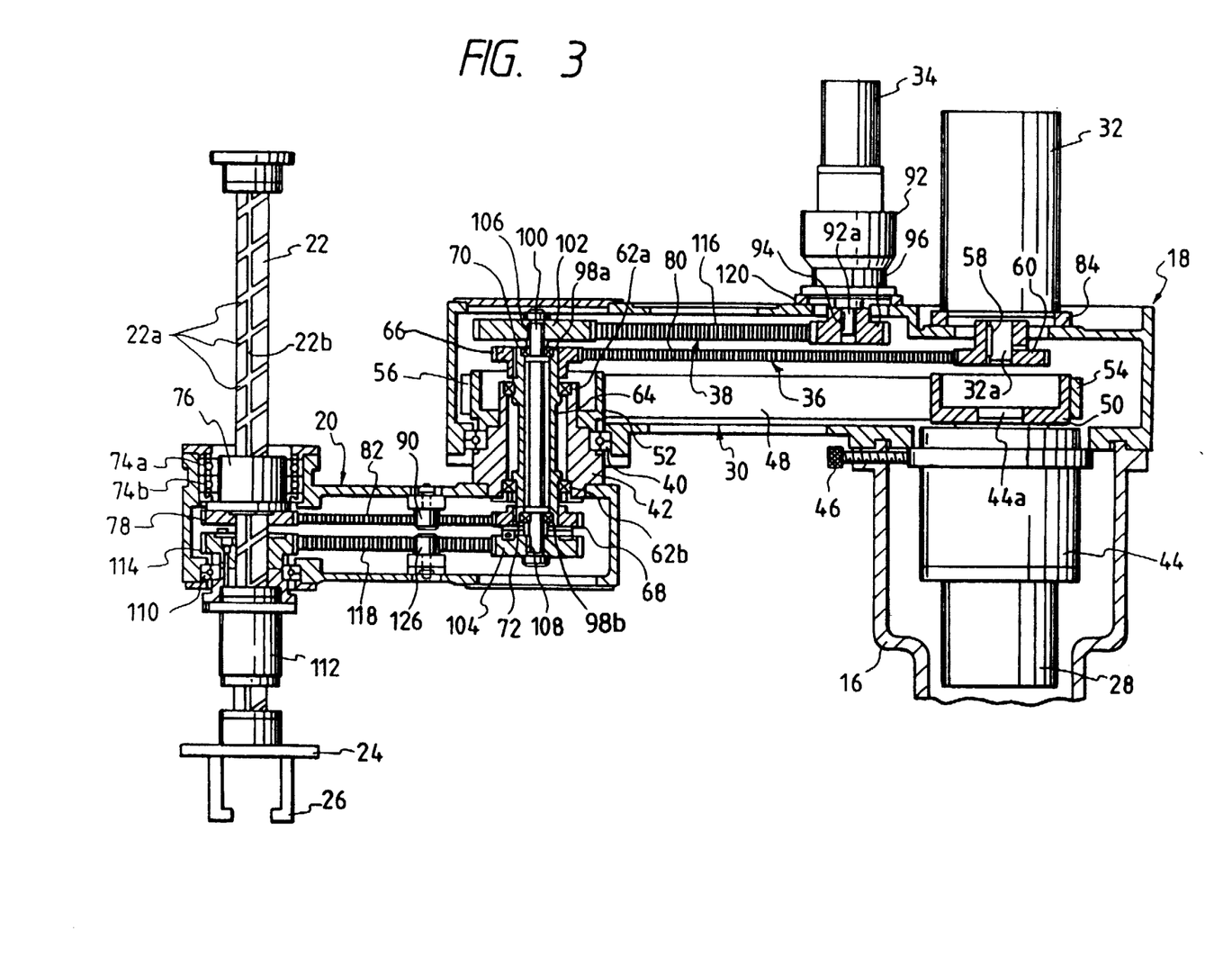
FIG. 3 is a longitudinal cross-sectional view showing the first to third transmission mechanisms in detail.

As shown in FIG. 3, a hollow cylindrical support member 42 is supported on the underside of the tip end portion of the first horizontal arm 18 for rotation about a vertical axis through a cross roller bearing 40, and this support member 42 extends so as to protrude downwardly from the underside of the first horizontal arm 18. The base end portion of the above-described second horizontal arm 20 has its upper surface secured to the lower portion of the support member 42. In this manner, the second horizontal arm 20 is supported for rotation relative to the first horizontal arm 18.

On the other hand, a speed reduction mechanism 44 is mounted on the above-described first drive motor 28, and this speed reduction mechanism is attached to the underside of the base end portion of the horizontal arm 18 with the drive shaft 44a thereof extending into the first horizontal arm 18. As shown, this speed reduction mechanism 44 is slightly displaceable in a horizontal direction in the strut 16. Design is made such that as will be described later, this speed reduction mechanism 44 is forced to be displaced in a horizontal plane through a tension adjusting screw 46, whereby the tension of an endless belt 48 in the first transmission mechanism 30 can be adjusted.

Description will now be made of the construction of the first transmission mechanism 30 for transmitting the drive force of the first drive motor 28 to the second horizontal arm 20 and rotatively driving this second horizontal arm 20 in a horizontal plane.

The first transmission mechanism 30 is provided with a drive pulley 50 coaxially fixed to the drive shaft 44a of the speed reduction mechanism 44, a driven pulley 52 coaxially fixed to the support member 42, and the aforementioned endless belt 48 endlessly wound between the drive pulley 50 and the driven pulley 52. The endless belt 48 is formed by a metallic thin sheet having flexibility and is set so as to be able to stand great tension.

Also, in order to positively prevent the slippage between the endless belt 48 and the drive and driven pulleys 50 and 52, fasteners 54 and 56 are mounted between the drive pulley 50 and the endless belt 50 and between the driven pulley 52 and the endless belt 52, respectively.

The first transmission 30 is constructed as described above and therefore, by the tension of the endless belt 48 being suitably adjusted through the tension adjusting screw 46 with the endless belt 48 passed over the drive and driven pulleys 50 and 52, the drive force of the first drive motor 28 is speed-reduced in the speed reduction mechanism 44 and is reliably transmitted to the second horizontal arm 20 and thus, this second horizontal arm 20 can be rotatively driven about the vertical axis at the tip end of the first horizontal arm 18.

On the other hand, the second drive motor 32 mounted above and in vertical alignment with the first drive motor 28 is placed on the upper surface of the first horizontal arm 18 in such a manner that the drive shaft 32a is protruded downwardly and located in the first horizontal arm 18. A ball thread groove 22a for vertical movement and a plurality of spline grooves 22b for rotatively driving the vertical arm 22 about the vertical axis are formed in the outer periphery of the vertical arm 22 moved along the vertical axis by the second drive motor 32 through the second transmission mechanism 36.

This second transmission mechanism 36 is provided with a drive pulley 60 coaxially secured to the tip end of the drive shaft 32a of the second drive motor 32 with a key 58 interposed therebetween. On the other hand, in and vertically through the above-mentioned hollow cylindrical support member 42, a hollow first transmission shaft 64 is supported for rotation about the vertical axis through a pair of upper and lower bearings 62a and 62b. First and second intermediate pulleys 66 and 68 are coaxially fixed to the upper and lower end portions, respectively, of the first transmission shaft 64 through keys 70 and 72, respectively.

Also, on the upper portion of the tip end portion of the second horizontal arm 20, a nut 76 for ball thread is supported for rotation about the vertical axis through a pair of upper and lower bearings 74a and 74b. This nut 76 for ball thread is designed to be rotatively driven while being threadably engaged with the above-mentioned ball thread groove 22a to thereby move the vertical arm 22 vertically, i.e., along the vertical axis. A driven pulley 78 is coaxially fixed to the underside of the nut 76 for ball thread.

The drive pulley 60, the first and second intermediate pulleys 66 and 68 and the driven pulley 78 have their outer peripheries formed into the shape of a spur gear.

On the other hand, a toothed first timing belt 80 is endlessly wound between the drive pulley 60 and the first intermediate pulley 66. Also, a toothed second timing belt 82 is endlessly wound between the second intermediate pulley 68 and the driven pulley 78.

Figure 4:
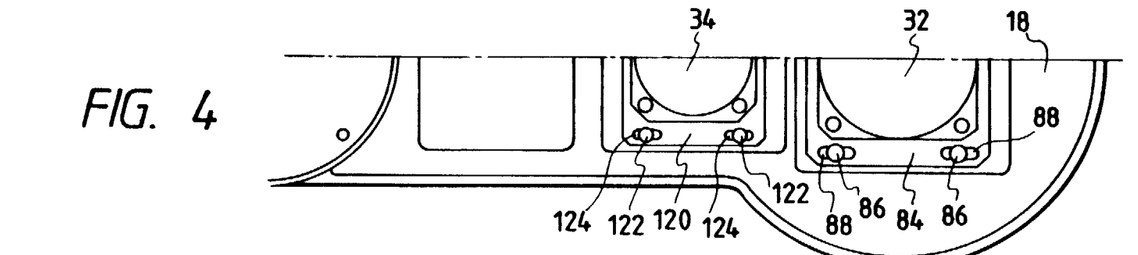
FIG. 4 is a plan view showing the mounted states of second and third drive motors.

As shown in FIG. 4, the second drive motor 32 is mounted on the first horizontal arm 18 through a first mounting plate 84. This first mounting plate 84 is secured to the first horizontal arm 18 through a plurality of bolts 86, and mounting holes 88 into which these bolts 86 are inserted are formed in the first mounting plate 84. Each of the mounting holes 88 is comprised of a slot extending in the direction of extension of the first horizontal arm 18. Thus, the tension of the first timing belt 80 can be arbitrarily adjusted by displacing the first mounting plate 84 in the direction of extension of the mounting holes 88 at a stage before the first mounting plate 84 is secured to the first horizontal arm 18 through the bolts 86.

On the other hand, as shown in FIG. 3, on the upper surface of the second horizontal arm 20, a first tension adjusting member 90, protruding downwardly, is mounted for displacement along a direction orthogonal to the direction of extension of the second horizontal arm 20. By suitably displacing this first tension adjusting member 90, the tension of the second timing belt 82 can be arbitrarily adjusted.

The second transmission mechanism 36 is constructed as described above and therefore, by suitably adjusting the tension of the first and second timing belts 80 and 82 through the first mounting plate 84 and the first tension adjusting member 90, respectively, with the first and second timing belts 80 and 82 passed over the drive and first intermediate pulleys 60 and 66 and over the driven and second intermediate pulleys 78 and 68, respectively, the drive force of the second drive motor 32 is reliably transmitted to the vertical arm 22, which can thus be moved along the vertical axis at the tip end of the second horizontal arm 20.

The third transmission mechanism 38 for transmitting the drive force of the third drive motor 34 to the vertical shaft 22 is provided with a drive pulley 96 coaxially secured to the tip end of the drive shaft 92a of a speed reduction mechanism 92 mounted on the second drive motor 32, through a key 94. On the other hand, in and vertically through the above-mentioned hollow cylindrical first transmission shaft 64, a solid second transmission shaft 100 is supported for rotation about the vertical axis through a pair of upper and lower bearings 98a and 98b. Third and fourth intermediate pulleys 102 and 104 are coaxially fixed to the upper and lower end portions, respectively, of the second transmission shaft 100 through keys 106 and 108, respectively.

Also, on the lower portion of the tip end portion of the second horizontal arm 20, a nut 112 for spline is supported for rotation about the vertical axis through a bearing 110. This nut 112 for spline is designed to be rotatively driven while being threadably engaged with the aforementioned spline thread 22b, thereby rotatively driving the vertical arm 22 about the vertical axis. A driven pulley 114 is coaxially fixed to the upper surface of the nut 112 for spline.

The drive pulley 96, the third and fourth intermediate pulleys 102 and 104 and the driven pulley 114 have their outer peripheries formed into the shape of a spur gear.

On the other hand, a toothed third timing belt 116 is endlessly wound between the drive pulley 96 and the third intermediate pulley 102. Also, a toothed fourth timing belt 118 is endlessly wound between the second intermediate pulley 104 and the driven pulley 114.

As shown in FIG. 4, the speed reduction mechanism 92 to which the third drive motor 34 is connected is mounted on the first horizontal arm 18 through a second mounting plate 120. This second mounting plate 120 is secured to the first horizontal arm 18 through a plurality of bolts 122, and is formed with mounting holes 124 into which these bolts 122 are inserted. Each of the mounting holes 124 is comprised of a slot extending along the direction of extension of the first horizontal arm 18. Thus, the tension of the third timing belt 116 can be arbitrarily adjusted by displacing the second mounting plate 120 along the direction of extension of the mounting holes 124 at a stage before the second mounting plate 120 is secured to the first horizontal arm 18 through the bolts 122.

On the other hand, as shown in FIG. 3, on the underside of the second horizontal arm 20, a second tension adjusting member 126 protruding upwardly is mounted for displacement along a direction orthogonal to the direction of extension of the second horizontal arm 20. Thus, by suitably displacing this second tension adjusting member 126, the tension of the fourth timing belt 118 can be arbitrarily adjusted.

The third transmission mechanism 38 is constructed as described above and therefore, by suitably adjusting the tension of the third and fourth timing belts 116 and 118 through the second mounting plate 120 and the second tension adjusting member 126 with the third and fourth timing belts 116 and 118 passed over the drive and third intermediate pulleys 96 and 102 and over the driven and fourth intermediate pulleys 114 and 104, respectively, the drive force of the third drive motor 34 is reliably transmitted to the vertical arm 22, which can thus be rotatively driven about the vertical axis at the tip end of the second horizontal arm 20.

On the other hand, in the third transmission mechanism 38, the diameters of the drive pulley 96 and the third intermediate pulley 102 are set such that the diameter of the third intermediate pulley 102 is larger, whereby there is constructed a first speed reduction mechanism for speed-reducing the drive force of the third drive motor 34 and transmitting it to the third intermediate pulley 102. Also, the diameters of the fourth intermediate pulley 104 coaxially connected to the third intermediate pulley 102 so as to rotate with the latter and the driven pulley 114 are set such that the diameter of the driven pulley 114 is larger, whereby there is likewise constructed a second speed reduction mechanism for speed-reducing the drive force from the third intermediate pulley 102 and transmitting it to the driven pulley 114 to thereby rotatively drive the vertical arm 22.

In this embodiment, the reduction ratio in the second speed reduction mechanism is set to 2.5:1. That is, it is set such that the third intermediate pulley 102 and accordingly, the fourth intermediate pulley 104 makes 2.5 rotations, whereby the driven pulley 114 makes 1 rotation.

Also, as is a feature of the present invention, first and second dogs 130 and 132 for the arrival of the vertical arm 22 at the original point and overrun detection are mounted on the upper surface of the third intermediate pulley 102 and the lower surface of the driven pulley 114, respectively. On the other hand, first and second sensors 134 and 136 for the arrival at the original point are disposed on the inner surface of the first horizontal arm 18 opposed to the upper surface of the third intermediate pulley 102 and the inner surface of the second horizontal arm 20 opposed to the lower surface of the driven pulley 114, respectively. Also, third and fourth sensors 138 and 140 for overrun detection are disposed on the inner surface of the first horizontal arm 18 opposed to the upper surface of the third intermediate pulley 102 and the inner surface of the second horizontal arm 20 opposed to the lower surface of the driven pulley 114, respectively, at rotated positions differing from those of the first and second sensors 134 and 136.

In this embodiment, the range of rotation of the vertical arm 22 is set to 370°, greater than one full rotation (360°), in other words, such that the vertical arm 22 is rotatable over the range of 185° in a clockwise direction (+185°) and the range of 185° in a counter-clockwise direction (−185°), and is set such that the overrun of the vertical arm 22 is detected at a point of time whereat the vertical arm 22 has been rotated by 185° or greater in the clockwise direction and the counter-clockwise direction, respectively.

Also, in this embodiment, the sensors 134, 136, 138 and 140 each are constructed in an eddy current fashion, and are set such that they output an ON signal when they come close to the corresponding dogs 130 and 132, and output an OFF signal when they become spaced apart from the corresponding dogs 130 and 132.

The states of extension of the first and second dogs 130 and 132 and the locations at which the first to fourth sensors 134, 136, 138 and 140 are disposed will hereinafter be described with reference to FIGS. 5 and 6.

Figure 5:
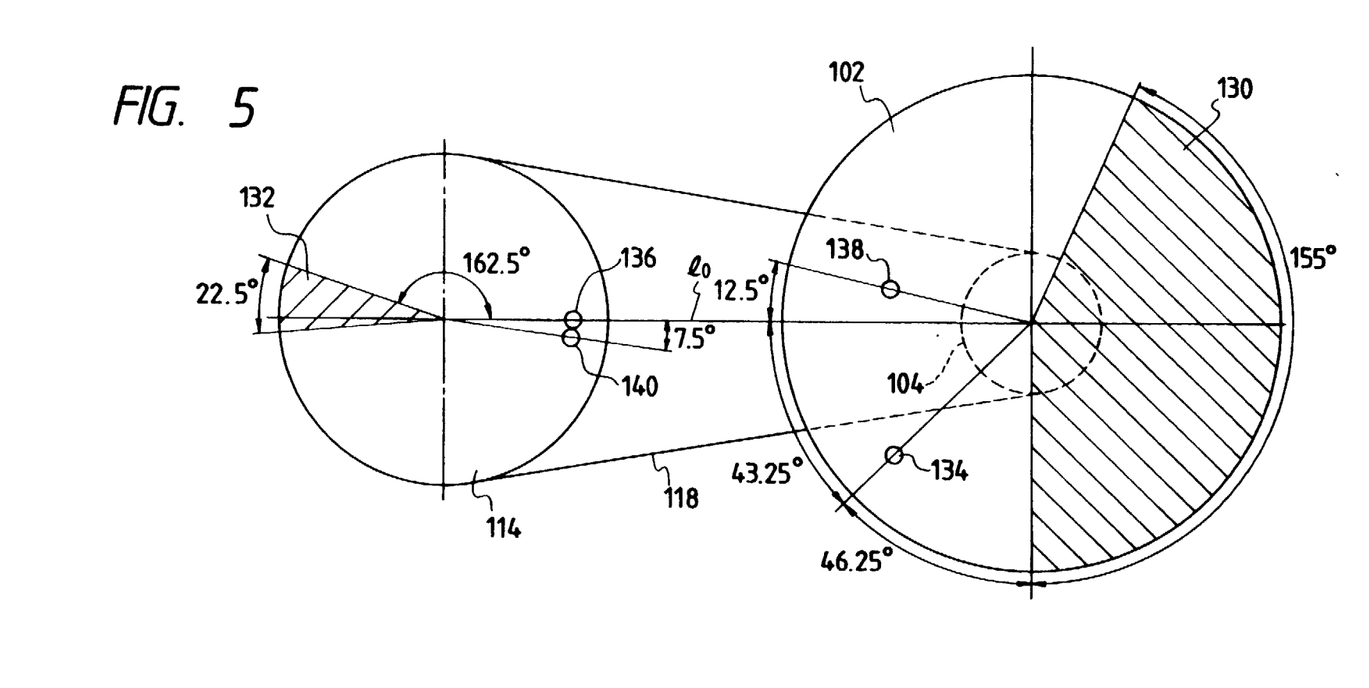
FIG. 5 is a top plan view showing the disposed states of first and second dogs.

When as shown in FIG. 5, a segment linking the center of the third intermediate pulley 102 (i.e., the fourth intermediate pulley 104) and the center of the driven pulley 114 together is represented by a symbol $l_0$ and the rotation-stopped state shown is prescribed as 0-degree position and that portion of the segment $l_0$ which is the right of the centers of the third intermediate pulley 102 and the driven pulley 114 is prescribed as a base line, the first dog 130 is formed so as to extend with in the range of 90° and 65° in the clockwise direction and the counter-clockwise direction, respectively, from the base line of the third intermediate pulley 102, and thus, within the range of total 155° with the base line interposed therebetween. Also, the second dog 132 is formed so as to extend by 22.5° in the counter-clockwise direction from the position of 162.5° in the counter-clockwise direction from the base line of the driven roller 114.

On the other hand, the first sensor 134 for the arrival at the original point is fixed to the inner surface of the first horizontal arm 18 so as to be opposed to the position of 136.25° in the clockwise direction from the base line on the upper surface of the third intermediate pulley 102. Also, the third sensor 138 for overrun detection is fixed to the inner surface of the first horizontal arm 18 so as to be opposed to the position of 167.5° in the counter-clockwise direction from the base line on the upper surface of the third intermediate pulley 102.

The second sensor 136 for the arrival at the original point is fixed to the inner surface of the second horizontal arm 20 so as to be opposed to the base line on the lower surface of the driven pulley 114. Also, the fourth sensor 140 for overrun detection is fixed to the inner surface of the second horizontal arm 20 so as to be opposed to the position of 7.5° in the clockwise direction from the base line on the lower surface of the driven pulley 114.

Figure 6:
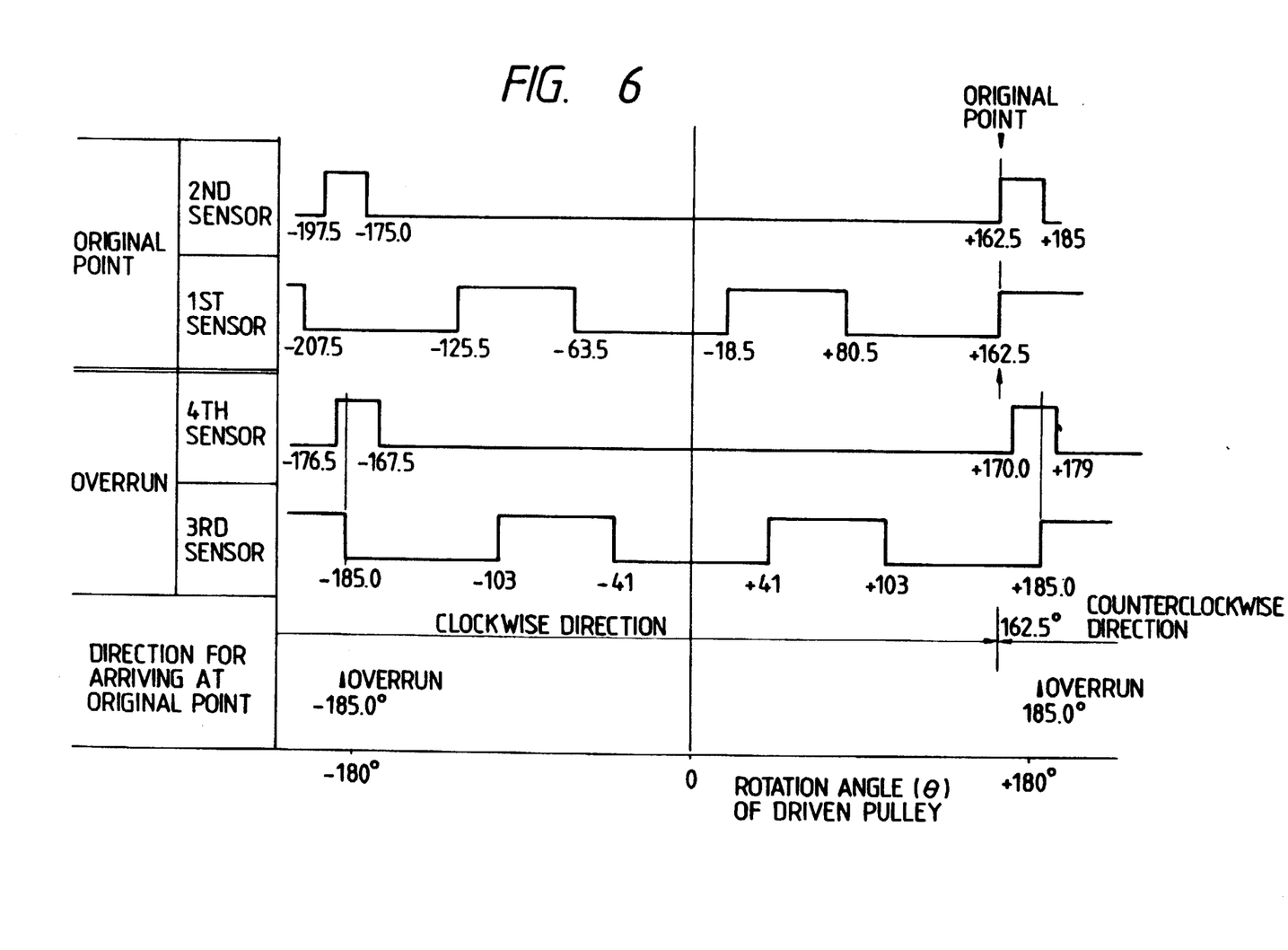
FIG. 6 is a timing chart showing the patterns of signals output from first to fourth sensors with the rotation of a vertical arm.

The ranges of extension of the first and second dogs 130 and 132 are prescribed as described above and also, the locations at which the first to fourth sensors 134, 136, 138 and 140 are disposed are prescribed as described above, whereby the third intermediate pulley 102 and the driven pulley 114 are rotated in the clockwise direction or the counter-clockwise direction from the 0-degree position shown in FIG. 5 and thus, first to fourth detection signals as shown in FIG. 6 are output from the first to fourth sensors 134, 136, 138 and 140, respectively.

In FIG. 6, the rotation angle indicated is expressed as the rotation angle $\theta$ of the driven pulley 114 which is to drive the vertical arm 22 directly. As described above, the reduction-ratio of the third intermediate pulley 102 and the driven pulley 114 is set to 2.5:1 and thus, by the third intermediate pulley being rotated, e.g. by 90°, the driven pulley 114 is rotated by 36°.

Figure 7:
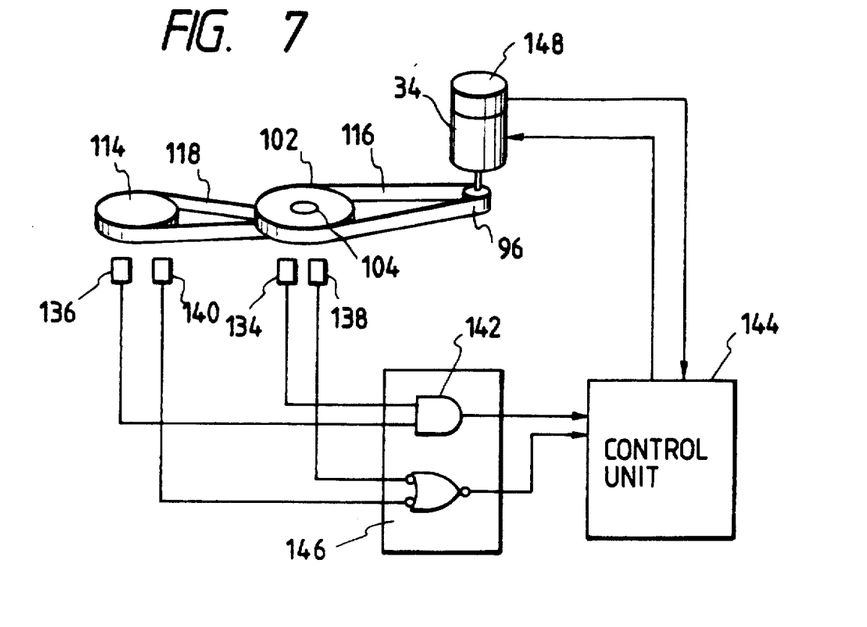
FIG. 7 is a schematic showing the connections between the first to fourth sensors and a control unit.

Also, in this embodiment, as shown in FIG. 7, the output terminals of the first and second sensors 134 and 136 for the arrival at the original point are connected to an AND gate circuit 142, the output terminal of which is connected to a control unit 144. On the other hand, the output terminals of the third and fourth sensors 138 and 140 for overrun detection are inverted and connected to an OR gate circuit 146, the output terminal of which is inverted and connected to the above-mentioned control unit 144.

That is, in this embodiment, both the arrival at the original point and overrun detection utilize the result of AND taken logically and particularly, overrun detection functions as a kind of fail safe and therefore, the OR gate circuit 146 uses a normally closed contact B. As a result, even when breakage occurs to the signal line from the third and fourth sensors 138 and 140 to the OR gate circuit 146, an ON signal is output from this OR gate circuit 146 and "overrun" is detected in a suspected manner so that the vertical arm 22 may be substantially prevented from overrunning beforehand.

In the control unit 144, regarding the arrival at the original point, design is made such that the angle for which ON signals are output from both of the first and second sensors 134 and 136 and an ON signal is output from the AND gate circuit 142 is recognized as a tentative original point position. More particularly, this control unit 144 is set so as to execute the control operation of looking for the Z phase of an encoder 148 for detecting the amount of rotation connected to the third drive motor 34, from a point of time at which the tentative original point position has been detected on the basis of the ON signal from the AND gate circuit 142, and recognize a true original point position at a point of time whereat the Z phase has been detected. This control unit 144 is designed to search the true original point position along a counter-clockwise direction from the tentative original point position when an ON signal is being output from the AND gate circuit 142, and to search the true original point position along a clockwise direction from the tentative original point position when an OFF signal is being output from the AND gate circuit 142.

Also, as shown in FIG. 7, the outputs from the first and second sensors 134 and 136 are out of phase with each other, and this amount of out-of-phase is prescribed on the basis of the reduction ratio of the third intermediate pulley 102 and the driven pulley 114 and the angles of extension of the first and second dogs 130 and 132, and if the limitation by overrun detection is neglected, the tolerance of rotation of the vertical arm 22 is determined by the minimum common multiple of the phases of the outputs of the first and second sensors 134 and 136.

Also, the control unit 144 is designed to judge by both of the third and fourth sensors 138 and 140 becoming ON that the vertical arm 22 has overrun beyond the limit range of rotation. This limit range rotation (in this embodiment, ±185° about the 0-degree position) of the vertical arm 22 can also be freely changed and set by arbitrarily setting the amount of out-of-phase between the third and fourth sensors 138 and 140.

The table below shows the mode of prescribing the direction of rotation from the tentative original point position to the true original point position, i.e., the direction for arriving at the original point, on the basis of the states of the outputs from the AND gate circuit 142 and the OR gate circuit 146 in the control unit 144, and the detection mode of the overrun state of the vertical arm 22.

TABLE

| Angle of rotation of vertical arm 22 (i.e. driven pulley 114) | Arriving at original point | | | Overrun detection | | | Direction for arriving at original point | Overrun detection state |
|---|---|---|---|---|---|---|---|---|
| | Output of 1st sensor | Output of 2nd sensor | Output of AND gate ckt. | Output of 3rd sensor | Output of 4th sensor | Output of OR gate ckt. | | |
| $\theta = 185.0$ | ON | ON | ON | ON | ON | ON | counter-clockwise | overrun |
| $170.0 \leq \theta < 185.0$ | ON | ON | ON | ON | OFF | OFF | counter-clockwise | operation range |
| $162.5 \leq \theta < 170.0$ | ON | ON | ON | OFF | OFF | OFF | counter-clockwise | |
| $-167.5 < \theta < -162.5$ | OFF | (OFF) | OFF | OFF | (OFF) | OFF | clockwise | |
| $-175.0 < \theta < -167.5$ | OFF | OFF | OFF | ON | OFF | OFF | clockwise | |
| $-185.0 < \theta < -175.0$ | ON | OFF | OFF | ON | OFF | OFF | clockwise | |
| $\theta = -185.0$ | ON | OFF | OFF | ON | OFF | ON | clockwise | overrun |

As described above in detail, according to this embodiment, the first dog 130 and the second dog 132 for arriving at the original point and for overrun detection, respectively, are mounted on the third intermediate pulley 102 and the driven pulley 114, respectively, connected together so as to be rotated with each other at a predetermined reduction ratio, the first and second sensors 134 and 136 for arriving at the original point are mounted on the first and second horizontal arms 18 and 20, respectively, in a state in which they can be opposed to the first and second dogs 130 and 132, respectively, and the third and fourth sensors 138 and 140 for overrun detection are mounted on the first and second horizontal arms 18 and 20, respectively, in a state in which they can be opposed to the first and second dogs 130 and 132, respectively. As a result, the original point position (the true original point position) of the vertical arm 22 can be detected (arriving at the original point) very accurately and also, in a state in which the vertical arm 22 is set to a range of rotation of 360° or greater, any rotation beyond this range of rotation (overrun) can be detected reliably.

This invention is not restricted to the construction of the above-described embodiment, but of course can be variously modified without departing from the gist of this invention.

For example, in the above-described embodiment, the multi-articulation robot 10 as the industrial robot has been described as being provided with the first and second sensors 134 and 136 for arriving at the original point and the third and fourth sensors 138 and 140 for overrun detection, whereas this invention is not restricted to such a construction, but is also applicable to a construction which is provided with only the first and second sensors 134 and 136 for arriving at the original point and is not provided with the third and fourth sensors 138 and 140 for overrun detection, and is also applicable to a construction which is not provided with the first and second sensors 134 and 136 for arriving at the original point and is provided with only the third and fourth sensors 138 and 140 for overrun detection.

Also, in the above-described embodiment, eddy current type sensors have been described as being applied to the sensors 134, 136, 138 and 140, whereas this invention is not restricted to such a construction, but any sensors which can detect the disposition areas of the first and second dogs 130 and 132 may be adopted.

Also, in the above-described embodiment, the first and second sensors 134 and 136 have been described as being connected to the control unit 144 through the AND gate circuit 142, and the third and fourth sensors 138 and 140 have been described as being connected to the control unit 144 through the OR gate circuit 146, whereas this invention is not restricted to such a construction, but the first to fourth sensors 134, 136, 138 and 140 may be directly connected to the control unit 144 and design may be made such that in this control unit 144, the output states of the first and second sensors 134 and 136 are directly discriminated to thereby execute the operation of arriving at the original point and the output states of the third and fourth sensors 138 and 140 are directly discriminated to thereby execute overrun detection.

Also, in the above-described embodiment, the first dog 130 has been described as being mounted on the upper surface of the third intermediate pulley 102, whereas this invention is not restricted to such a construction, but the first dog 130 can be mounted on the lower surface of the fourth intermediate pulley 104 coaxially connected to the third intermediate pulley 102 and rotated with this pulley 102, thereby obtaining a similar effect.

Figure 8A:
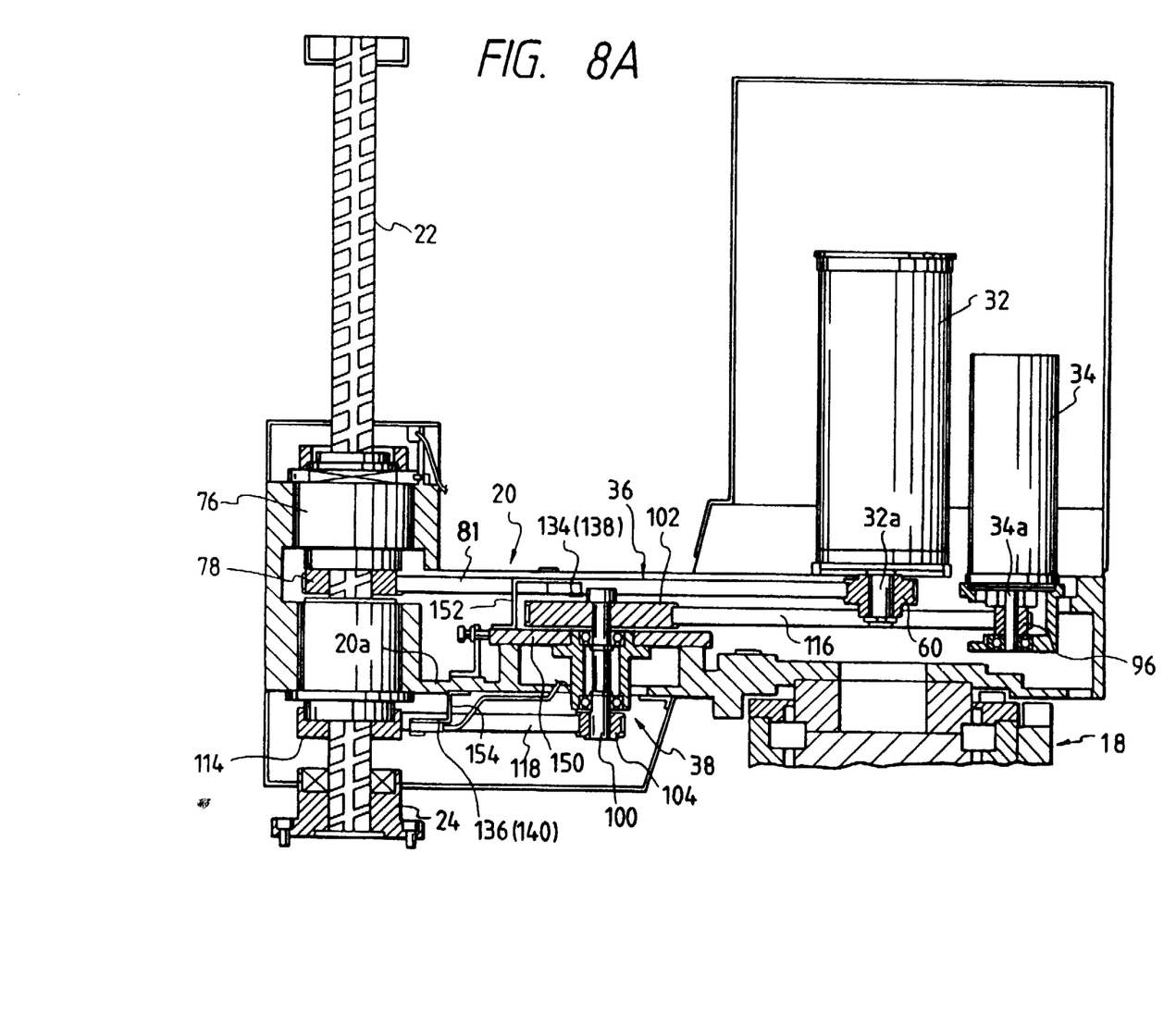
FIGS. 8A to 8C are respectively a longitudinal cross-sectional view showing the construction of another embodiment of the industrial robot according to the present invention with the essential portions thereof taken out, a top plan view showing the internal construction of a second horizontal arm, and a bottom plan view.
Figure 8B:
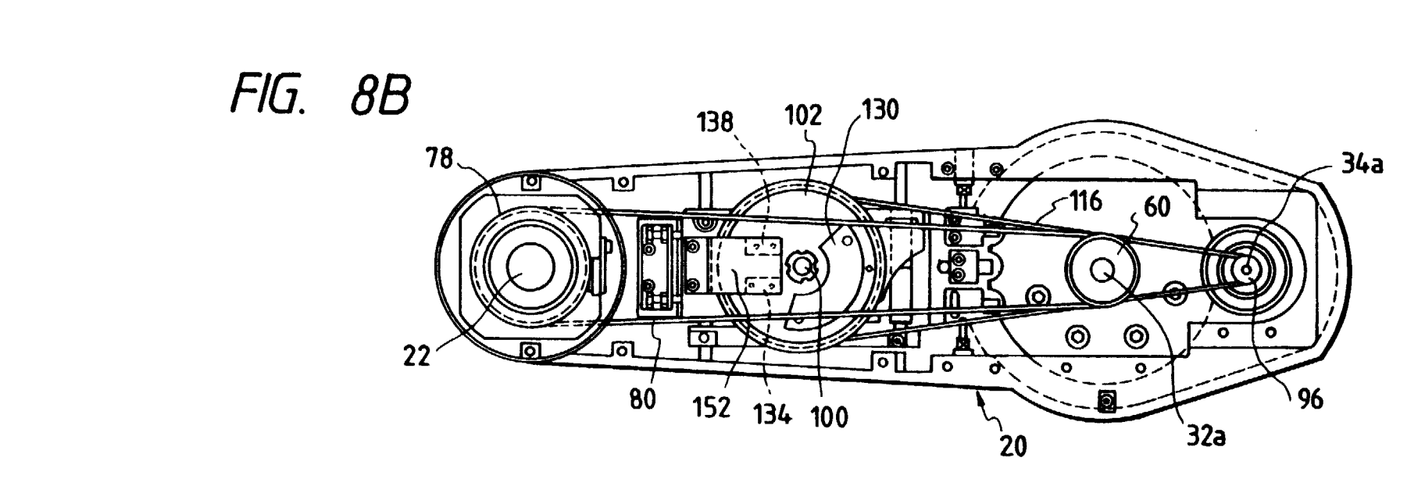
Figure 8C:
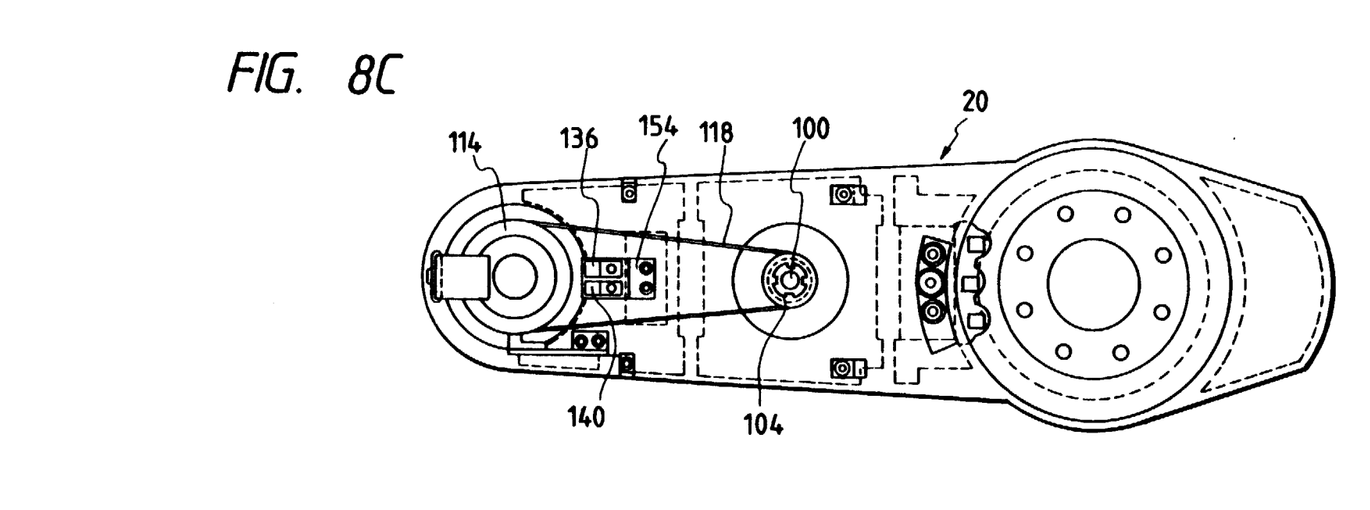

Also, in the above-described embodiment, the second drive motor 32 for vertically driving the vertical arm 22 and the third drive motor 34 for rotatively driving the vertical arm 22 have been described as being mounted on the first horizontal arm 18, whereas this invention is not restricted to such a construction, but as shown as another embodiment in FIGS. 8A to 8C, the second and third drive motors 32 and 34 may be mounted on the second horizontal arm 20.

In the following description of the construction of another embodiment, the same portions as those in the above-described embodiment are given the same reference numerals and need not be described.

That is, in said another embodiment, as shown in FIG. 8A, the second and third drive motors 32 and 34 are mounted on the base end portion of the second horizontal arm 20, and more particularly, on that end portion of the second horizontal arm which is connected to the tip end portion of the first horizontal arm 18. The second transmission mechanism 36 for transmitting the drive force of the second motor 32 for vertical driving to the vertical arm 22, unlike the above-described embodiment, extends in only the second horizontal arm 20, and without the intermediary of the first and second intermediate pulleys 66 and 68, the drive pulley 60 is belt-connected to the driven pulley 78 through only the first timing belt 81.

On the other hand, the third transmission mechanism 36 for transmitting the drive force of the third drive motor 34 to the vertical arm 22 is provided with a second transmission shaft 100 in the intermediate portion of the second horizontal arm 20 with respect to the lengthwise direction thereof in a state in which it is supported for rotation about the vertical axis relative to a support member 150 supported on an extended portion 20a formed integrally with the second horizontal arm 20, and a third intermediate pulley 102 of large diameter and a fourth intermediate pulley 104 of small diameter are connected to the upper end and the lower end, respectively, of the second transmission shaft 100 so as to rotate with the second transmission shaft 100.

The first and second sensors 134 and 136, as shown in FIGS. 8A and 8B, are mounted on the upper surface of the support member 150 through a first mounting stay 152. On the other hand the third and fourth sensors 138 and 150, as shown in FIGS. 8A and 8C, are mounted on the lower surface of the aforementioned extended portion 20a through a second mounting stay 154.

By thus constructing said another embodiment, there can be obtained an effect similar to that of the above-described embodiment.

Besides the disposition and structure of the second and third drive motors 32 and 34 described in said another embodiment, the second drive motor 32 and the third drive motor 34 may be discretely disposed on the first horizontal arm 18 and the second horizontal arm 20, respectively, or the second drive motor 32 and the third drive motor 34 may be discretely disposed on the second horizontal arm 20 and the first horizontal arm 18, respectively.

Also, in the above-described embodiment, in the drive force transmission route designed to transmit the drive force of the third drive motor 34 to the driven pulley 114 directly connected to the vertical arm 22, through the two-stage speed reduction mechanism comprising the first and second speed reduction mechanisms, the first and second dogs 130 and 132 have been described as being mounted on the third intermediate pulley 102 and the driven pulley 114, respectively, which together constitute the second-stage speed reduction mechanism, whereas this invention is not restricted to such a construction, but is also applicable to a construction in which the third drive motor 34 directly rotatively drives the third intermediate pulley 102, i.e., a drive force transmission mechanism provided with only a single speed reduction mechanism. In short, in the present invention, any construction in which, the first and second dogs 130 and 132 are mounted on a pair of pulleys, respectively, which constitute a speed reduction mechanism obtains a constructionally similar effect whether the speed reduction mechanism is the first stage or the second or subsequent stage, and this is within a modifiable range.

Figure 9A:
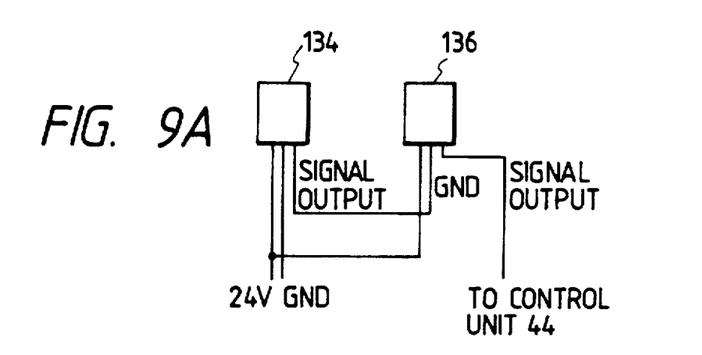
FIGS. 9A and 9B are schematics showing modifications of the industrial robot according to the present invention.
Figure 9B:
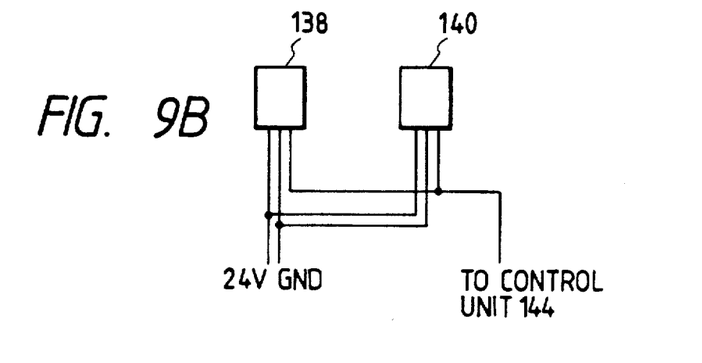

Also, in the above-described embodiment, the outputs of the first and second sensors 134 and 136 have been described as being connected to the control unit 144 through the AND gate circuit 142 and the outputs of the third and fourth sensors 138 and 140 have been described as being connected to the control unit 144 through the OR gate circuit 146, whereas this invention is not restricted to such a construction, but as shown as a modification in FIGS. 9A and 9B, without using these gate circuits, a connected state which is logically equivalent to these gate circuits can be formed to thereby achieve a similar effect.

As described above, the industrial robot according to the present invention is an industrial robot provided with a body, a horizontal arm pivotally supported on said body, and a vertical arm mounted on the tip end portion of said horizontal arm for rotation about its own center axis. The robot features a drive motor for rotatively driving said vertical arm, speed reduction means for speed-reducing and transmitting the drive force of said drive motor through a first output pulley to a second output pulley, first and second detected portions mounted on said first and second output pulleys, respectively, with respective predetermined ranges of extension and indicating the original point position of said vertical arm by the difference between the respective phases thereof, first and second detecting means fixed to said horizontal arm and outputting first and second detection signals, respectively, as long as they are detecting said first and second detected portions, respectively, and control means for judging the original point position of said vertical arm on the basis of the output modes of the first and second detection signals from said first and second detecting means, respectively.

Also, the industrial robot according to the present invention is an industrial robot provided with a body, a horizontal arm pivotally supported on said body, and a vertical arm mounted on the tip end portion of said horizontal arm for rotation about its own center axis. The robot features a drive motor for rotatively driving said vertical arm, speed reduction means for speed-reducing and transmitting the drive force of said drive motor through a first output pulley to a second output pulley, third and fourth detected portions mounted on said first and second output pulleys, respectively, with respective predetermined ranges of extension and indicating the range of rotation of said vertical arm by the difference between the respective phases thereof, third and fourth detecting means fixed to said horizontal arm and outputting third and fourth detection signals, respectively, as long as they are detecting said third and fourth detected portions, respectively, and control means for judging the rotated state of said vertical arm over the range of rotation thereof or greater on the basis of the output modes of the third and fourth detection signals from said third and fourth detecting means, respectively.

Also, the industrial robot according to the present invention is an industrial robot provided with a body, a horizontal arm pivotally supported on said body, and a vertical arm mounted on the tip end portion of said horizontal arm for rotation about its own center axis. The robot includes a drive motor for rotatively driving said vertical arm, speed reduction means for speed-reducing and transmitting the drive force of said drive motor through a first output pulley to a second output pulley, first and second detected portions mounted on said first and second output pulleys, respectively, with respective predetermined ranges of extension and indicating the original point position of said vertical arm by the difference between the respective phases thereof, first and second detecting means fixed to said horizontal arm and outputting first and second detection signals, respectively, as long as they are detecting said first and second detected portions, respectively, third and fourth detected portions mounted on said first and second output pulleys, respectively, with respective predetermined ranges of extension and indicating the range of rotation of said vertical arm by the difference between the respective phases thereof, third and fourth detecting means fixed to said horizontal arm and outputting third and fourth detection signals, respectively, as long as they are detecting said third and fourth detected portions, respectively, and control means for judging the original point position of said vertical arm on the basis of the output modes of the first and second detection signals from said first and second detecting means, respectively, and also judging the rotated state of said vertical arm over the range of rotation thereof or greater on the basis of the output modes of the third and fourth detection signals from said third and fourth detecting means, respectively.

Thus, according to the present invention, there is provided an industrial robot in which the rotated state of a vertical arm is mechanically detected and which can accomplish the arrival at the original point with good accuracy.

Also, according to the present invention, there is provided an industrial robot in which the rotated state of a vertical arm is mechanically detected and which can easily accomplish overrun detection with a range of rotation of 360° or greater prescribed.

Also, according to the present invention, there is provided an industrial robot in which the rotated state of a vertical arm is mechanically detected and which can accomplish the arrival at the original point with good accuracy and can also accomplish overrun detection with a range of rotation of 360° or greater prescribed.

What is claimed is:

1. An apparatus comprising:
   a rotational shaft on which a robot hand is mounted;
   a motor for rotating said rotational shaft;
   first and second pulleys for transmitting rotation of said motor to said rotational shaft;
   first speed reduction means for speed-reducing rotation of said motor;
   second speed reduction means for speed-reducing rotation of said second pulley;
   first detecting means for detecting an original position of said first pulley;
   second detecting means for detecting an original position of said second pulley; and
   means for matching both said first pulley and said second pulley at an original position, said matching means comprising:
   means for effecting a plurality of signal outputs from said first detection means and a signal output from said second detecting means within one rotation of said second pulley; and logic means for processing each signal output whereby, the apparatus detects a rotating original position of said rotational shaft of the robot hand.

2. An apparatus according to claim 1, wherein said signal output means in said original position matching means comprises means for setting a time of the signal output of said first detecting means to be longer than that of said second detecting means.

3. An apparatus according to claim 2, further comprising:
   a first rotational arm in which said first speed reduction means is contained;
   a second rotational arm in which said second speed reduction means is contained; and
   means for coupling said first and second rotational means with each other.

4. An apparatus according to claim 2, wherein said matching means further comprises:
   third detecting means mounted on said first pulley for detecting overrun;
   fourth detecting means mounted on said second pulley for detecting overrun; and
   means for processing signals from said third and fourth detecting means to output a signal for detecting the overrun.

5. An apparatus comprising:
   a rotational shaft on which a robot hand is mounted;
   a motor for rotating said rotational shaft;
   first and second pulleys for transmitting rotation of said motor to said rotational haft;
   first speed reduction means for speed-reducing rotation of said motor;
   second speed reduction means for speed-reducing rotation of said second pulley;
   first detecting means mounted on said first pulley for detecting an overrun position;
   second detecting means mounted on said second pulley for detecting an overrun position;
   means for matching both said first pulley and said second pulley at a predetermined overrun position, said means comprising:
   means for effecting a plurality of signal outputs from said first detecting means and a signal output from said second detecting means within the time of one rotation of said second pulley; and
   logic means for processing each signal output whereby, the apparatus detects overrun of said rotational shaft of the robot hand.

6. An apparatus according to claim 5, wherein said signal output means in said overrun position matching means comprises means for setting a time of the signal output of said first detecting means to be longer than that of said second detecting means.

7. An apparatus according to claim 6, further comprising:
   a first rotational arm in which said first speed reduction means is contained;
   a second rotational arm in which said second speed reduction means is contained; and
   means for coupling said first and second rotational means with each other.

* * * * *

UNITED STATES PATENT AND TRADEMARK OFFICE
CERTIFICATE OF CORRECTION

PATENT NO. : 5,271,292
DATED : December 21, 1993
INVENTOR(S) : Sawada et al.

It is certified that error appears in the above-indentified patent and that said Letters Patent is hereby corrected as shown below:

COLUMN 14:

Line 68, "detection" should read --detecting--.

COLUMN 15:

Line 32, "haft;" should read --shaft;--.

Signed and Sealed this

Ninth Day of August, 1994

Attest:

BRUCE LEHMAN

Attesting Officer

Commissioner of Patents and Trademarks